United States Patent
Shin et al.

(10) Patent No.: US 9,928,675 B2
(45) Date of Patent: Mar. 27, 2018

(54) DIGITAL DOORLOCK SYSTEM

(71) Applicant: CHAHOO Co., Ltd., Seongnam-si, Gyeonggi-do (KR)

(72) Inventors: Chang Hoon Shin, Seongnam-si (KR); Sung Hyuk Kang, Seongnam-si (KR)

(73) Assignee: CHAHOO Co., Ltd., Seongnam-si, Gyeonggi-Do (KR)

( * ) Notice: Subject to any disclaimer, the term of this patent is extended or adjusted under 35 U.S.C. 154(b) by 0 days.

(21) Appl. No.: 15/484,696

(22) Filed: Apr. 11, 2017

(65) Prior Publication Data
US 2017/0294061 A1    Oct. 12, 2017

(30) Foreign Application Priority Data
Apr. 12, 2016    (KR) .................. 10-2016-0045132

(51) Int. Cl.
*G07C 9/00*    (2006.01)
*H04W 4/00*    (2018.01)
*H04W 40/24*    (2009.01)

(52) U.S. Cl.
CPC ....... *G07C 9/0069* (2013.01); *G07C 9/00309* (2013.01); *H04W 4/008* (2013.01); *H04W 40/244* (2013.01); *G07C 2009/00769* (2013.01)

(58) Field of Classification Search
CPC .............. G07C 9/0069; G07C 9/00309; G07C 2009/00769; H04W 4/008; H04W 40/244
USPC .................................................. 340/5.5–5.55
See application file for complete search history.

(56) References Cited

U.S. PATENT DOCUMENTS

| | | | |
|---|---|---|---|
| 5,517,184 A | 5/1996 | Miller | E05B 37/00 340/5.28 |
| 9,671,300 B2 | 6/2017 | Neubarth | G01L 9/0073 |
| 2007/0146115 A1 | 6/2007 | Roosli | E05B 47/00 340/5.6 |
| 2014/0197692 A1 | 7/2014 | Chen | G07C 9/00174 307/104 |
| 2014/0265359 A1 | 9/2014 | Cheng | E05B 47/026 292/144 |
| 2014/0340032 A1 | 11/2014 | Curtis | H04B 5/0037 320/108 |
| 2016/0273986 A1 | 9/2016 | Neubarth | G01L 9/0073 |

*Primary Examiner* — Allen T Cao
(74) *Attorney, Agent, or Firm* — Rabin & Berdo, P.C.

(57) ABSTRACT

Provided is a digital doorlock system including a doorlock configured to transmit an iBeacon signal and reduce a period of Bluetooth connection when recognizing proximity of a user terminal and a touch or a press on a keypad, wherein the doorlock is wirelessly connected to the user terminal so that an opening/closing operation of the doorlock is controlled, a user application installed in the user terminal and configured to enter a state of being capable of controlling the doorlock upon receiving the iBeacon signal and control the opening/closing operation of the doorlock when wirelessly connected to the doorlock via the user terminal, and a management server configured to provide a password for controlling the opening/closing operation of the doorlock to the user application through user authentication.

6 Claims, 5 Drawing Sheets

DIGITAL DOORLOCK SYSTEM

CROSS-REFERENCE TO RELATED APPLICATION

This application claims priority to Korean Patent Application No. 10-2016-0045132 filed on Apr. 12, 2016 and all the benefits accruing therefrom under 35 U.S.C. § 119, the contents of which are incorporated by reference in their entirety.

BACKGROUND

The present disclosure relates to a digital doorlock system.

As the number of smartphone users increases, doorlock systems enhanced with a communication function are being commercialized so that existing doorlocks can be used more conveniently and safely.

Such doorlocks having a communication function may be installed on entrance doors of private residences, accommodations, or the like so that users may control opening/closing of the doorlocks by transmitting password information from mobile terminals to the doorlocks through wireless communication. Most smartphones that are commonly used at the present time support a Bluetooth function so that doorlocks may be used more conveniently through direct communication between the doorlocks and the smartphones.

However, when controlling a Bluetooth doorlock by using a smartphone, a delay of about five seconds or longer may occur due to a communication interruption that may occur during Bluetooth communication. This situation may cause a user to doubt the stability of a Bluetooth doorlock.

Furthermore, when controlling a doorlock by using a doorlock application for Bluetooth, the doorlock should be controlled within a short distance from the doorlock even though the application is automatically activated on a smartphone.

SUMMARY

The present disclosure provides a digital doorlock system capable of minimizing a delay that may occur during controlling a doorlock through short-range wireless communication, and improving ease of use and stability by enabling the doorlock to be controlled even when an application is not activated.

In accordance with an exemplary embodiment of the present invention, a digital doorlock system includes: a doorlock configured to transmit an iBeacon signal and reduce a period of Bluetooth connection when recognizing proximity of a user terminal and at least one of a touch or a press on a keypad, wherein the doorlock is wirelessly connected to the user terminal so that an opening/closing operation of the doorlock is controlled; a user application installed in the user terminal and configured to enter a state of being capable of controlling the doorlock upon receiving the iBeacon signal and control the opening/closing operation of the doorlock when wirelessly connected to the doorlock via the user terminal; and a management server configured to provide a password for controlling the opening/closing operation of the doorlock to the user application through user authentication.

The doorlock may include: the keypad configured to operate in response to a touch or a button press; a Bluetooth beacon module configured to transmit the iBeacon signal and communicate with the user application by being wirelessly connected to the user terminal; an opening/closing control module configured to request, via the Bluetooth beacon module, a password from the user application and open or close an entrance door according to the password received from the user application; a proximity sensor configured to recognize a metal part of the user terminal positioned in front of the doorlock to detect proximity of the user terminal; and a touch/pressure sensor configured to detect the touch or the press on the keypad.

The Bluetooth beacon module may reduce a period of transmission of a Bluetooth connection signal when the proximity of the user terminal and at least one of the touch or the press on the keypad are recognized by the proximity sensor and the touch/pressure sensor, and may release a Bluetooth connection when control of the doorlock by the user application is completed.

Upon receiving the iBeacon signal from the doorlock, the user application may operate in a background of the user terminal so as to enable control of the doorlock.

When the user authentication is completed through the user application, the management server may provide a user codebook including a plurality of passwords having different coordinate information.

The doorlock simultaneously may request, from the user terminal, a plurality of passwords assigned to arbitrary coordinates or a password obtained by combining, in a specific order, values from respective passwords corresponding to the arbitrary coordinates on the basis of a pre-stored manager codebook, the user application may respond to the request from the doorlock on the basis of the user codebook, and the doorlock may check, on the basis of the manager codebook, response information received from the user application, and may operate according to whether the response information matches the manager codebook.

BRIEF DESCRIPTION OF THE DRAWINGS

Exemplary embodiments can be understood in more detail from the following description taken in conjunction with the accompanying drawings, in which.

DETAILED DESCRIPTION OF EMBODIMENTS

Figure 1:
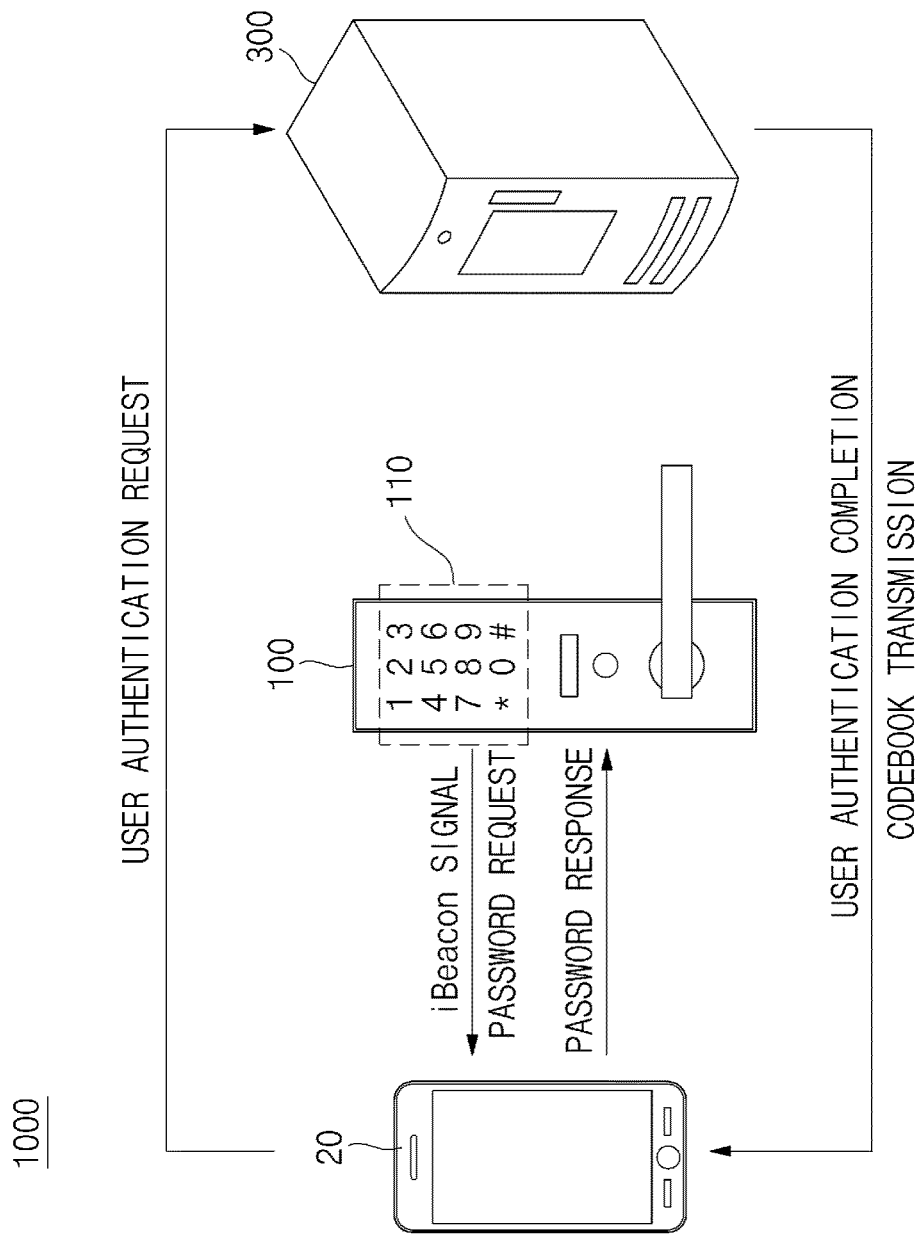
FIG. 1 is a diagram illustrating an overall structure of a digital doorlock system according to an embodiment of the present invention.

The terms used herein will be briefly described, and the present invention will be described in detail.

The terms used herein have been selected from among general terms that are widely used at the present time in consideration of the functions of the present invention, but may be changed depending on intentions of those skilled in the art, judicial precedents, or the advent of new technology.

Furthermore, specific terms have been arbitrarily selected by the applicant, and the meanings of such terms will be described in detail in relevant sections of the description. Therefore, it should be understood that the terms used herein should not be simply defined literally but should be defined on the basis of the meanings of the terms and the overall contents of the present disclosure.

In the description, when it is described that a certain part includes certain elements, the part may further include other elements, unless otherwise specified. The term " . . . unit" or "module" denotes a unit for processing at least one function or operation, and may be implemented as hardware or software or a combination thereof.

Hereinafter, embodiments of the present invention will be described in detail with reference to the accompanying drawings so that the embodiments of the present invention can be easily carried out by those skilled in the art. However, the embodiments of the present invention may be implemented in various different forms and should not be construed as being limited to the examples described herein. Some parts of the embodiments, which are not related to the description, are not illustrated in the drawings in order to clearly describe the embodiments of the present invention. Like reference numerals refer to like elements throughout the description.

Figure 2:
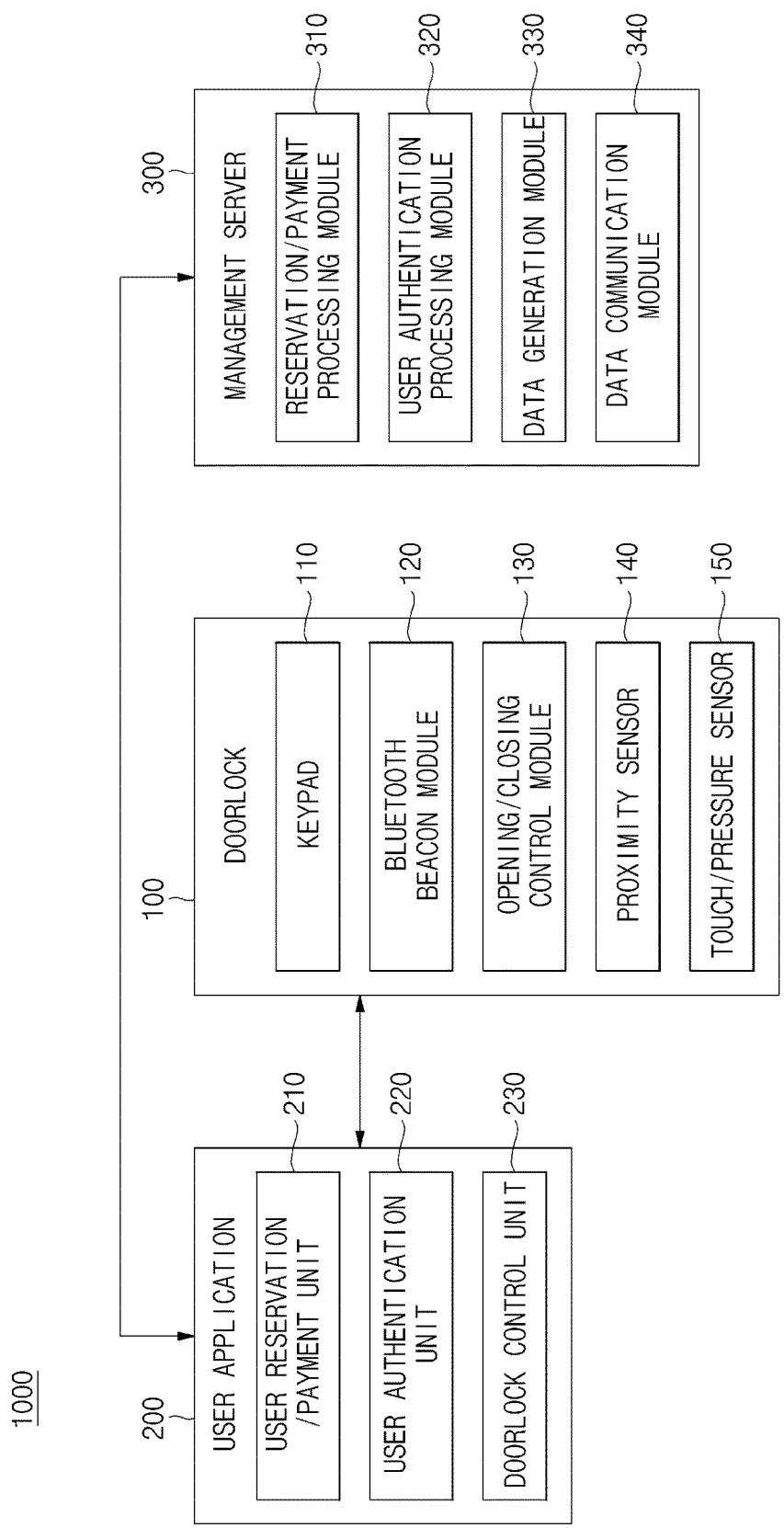
FIG. 2 is a block diagram illustrating an overall configuration of the digital doorlock system according to an embodiment of the present invention.

FIG. 1 is a diagram illustrating an overall structure of a digital doorlock system according to an embodiment of the present invention, and FIG. 2 is a block diagram illustrating an overall configuration of the digital doorlock system according to an embodiment of the present invention.

Referring to FIGS. 1 and 2, a digital doorlock system 1000 according to an embodiment of the present invention includes a doorlock 100, a user application 200, and a management server 300.

The doorlock 100 may receive an iBeacon signal, and when recognizing at least one of proximity of a user terminal 20 or a touch or press on a keypad 110, may reduce a period of Bluetooth connection to the user terminal 20 while entering a Bluetooth connectable state, and may be wirelessly connected to the user terminal 20, so that an opening/closing operation of the doorlock 100 may be controlled. To this end, the doorlock 100 may include the keypad 110, a Bluetooth beacon module 120, an opening/closing control module 130, a proximity sensor 140, and a touch/pressure sensor 150.

The keypad 110, which is installed at a front of the doorlock 100 to manually receive a password from a user, includes a touch screen or a button on which numerals and symbols are displayed, and is connected to the touch/pressure sensor 150.

The Bluetooth beacon module 120 may externally transmit the iBeacon signal, and may be wirelessly connected to the user terminal 20 through Bluetooth (e.g., 4.0 BLE) so as to perform communication for controlling the doorlock 100. For example, the Bluetooth beacon module 120 may be connected to the user terminal 20 within a Bluetooth connection range, may transmit a password request signal for controlling the doorlock 100 to the user application 200, and may receive, from the user application 200, password response information as a response to the password request signal. The Bluetooth beacon module 120 may transmit the password request signal to the user terminal 20 after performing AES 128-bit or higher encryption on the password request signal in order to prevent hacking by a third party.

The password request signal may include arbitrary coordinate information based on a manager codebook pre-stored in the doorlock 100, and the password response information may include a password value corresponding to a coordinate value of the received request signal. Here, the password value included in the response information may be obtained on the basis of a user codebook stored in the user application 200.

In the present embodiment, the codebooks may include a plurality of different passwords having different coordinate values. For example, in the case where the coordinate values range from 00 to 99, different password values are allocated to the coordinate values respectively, so that the codebooks may include 100 different password values.

The codebooks may be divided into the manager codebook stored in the doorlock 100 and the user codebook stored in the user application 200, and the manager codebook and the user codebook may include the same coordinate information and password information. The manager codebook may be stored during an initialization process of the doorlock 100, and upon completion of user authentication through the management server 300, the user codebook may be transmitted to the authenticated user terminal 20.

The opening/closing control module 130 may check, on the basis of the manager codebook, the response information received from the user application 200, and may perform an opening/closing operation according to whether the received information matches the manager codebook. To this end, the opening/closing control module 130 may include a software means and a hardware means.

The software means may generate, on the basis of the manager codebook, the password request signal to be transmitted to the user terminal 20, and may check, on the basis of the manger codebook, the response information received from the user application 200 to determine whether a received password value matches a requested coordinate value. For example, if password values "[15413248], [5156248654], [9548726417], [016372890], [1564781458]" are received by transmitting the password request signal with coordinate values "[10], [25], [94], [55], [37]", the software means may compare password values corresponding to the coordinate values "[10], [25], [94], [55], [37]" in the manager codebook with the received password values "[15413248], [5156248654], [9548726417], [016372890], [1564781458]" to determine whether they match each other, and if they match each other, the software means may determine that correct key values have been input, or if they do not match each other, the software means may generate and output an input value error signal via the Bluetooth beacon module 120.

Furthermore, the software means may request a password obtained by combining, in a specific order, values from respective passwords corresponding to arbitrary coordinate values of the manager codebook. For example, when generating the request signal with the coordinate values "[10], [25], [94], [55], [37]", the software means may combine a first value from a password of the coordinate [10], a second value from a password of the coordinate [25], a third value from a password of the coordinate [94], a fourth value from a password of the coordinate [55], and a fifth value from a password of the coordinate [37] to request the combined values as a single password.

Furthermore, the software means may determine, on the basis of the manager codebook, whether the response signal to the above-mentioned password request signal matches a desired password value, and when they match each other, the software means may transmit an opening/closing signal to the opening/closing control module 130. Furthermore, when passwords do not match each other, the software means may notify the user of a password error through light emission of the keypad 110 or an additional voice output means, and when necessary, the software means may instruct the Bluetooth beacon module 120 to disconnect from the user terminal 20.

The hardware means may lock or unlock an entrance door in response to a control signal of the software means. For example, when the software means determines that the password received from the user application 200 is matched, the hardware means may receive a door open signal from the software means to operate so as to unlock the entrance door. Furthermore, when a certain time elapses after unlocking the entrance door, the hardware means may receive a door close signal from the software means to operate so as to lock the entrance door.

The proximity sensor 140 may detect proximity of the user terminal 20, which is positioned in front of the doorlock 100, to the doorlock 100. For example, the proximity sensor 140 may detect the proximity of the user terminal 20 by sensing a metal part of the user terminal 20 positioned within a distance of about 1 cm to about 2 cm from the proximity sensor 140. For example, the proximity sensor 140 may include a differential coil-type sensor, but the present embodiment is not limited to such the proximity sensor 140, and thus any sensor capable of recognizing the metal part of the user terminal 20 may be applied as the proximity sensor 140. This proximity sensor 140 may transmit a first detection signal to the Bluetooth beacon module 120 when detecting the proximity of the user terminal 20.

The touch/pressure sensor 150 may be connected to the keypad 110 of the doorlock 100 to detect a user's touch or press on the keypad 110. This touch/pressure sensor 150 may transmit a second detection signal to the Bluetooth beacon module 120 when detecting the touch or the press on the keypad 110.

Meanwhile, when the Bluetooth beacon module 120 recognizes the proximity and at least one of the touch or the press by means of the first detection signal of the proximity sensor 140 and the second detection signal of the touch/pressure sensor 150, the Bluetooth beacon module 120 may reduce the period of Bluetooth connection so as to be more quickly connected to the user terminal 20 adjacent to the doorlock 100. For example, when the period of Bluetooth connection is one time per one second, a delay of up to one second is required, but since the Bluetooth beacon module 120 recognizes the proximity of the user terminal 20 and at least one of the touch or the press on the keypad 110, the Bluetooth beacon module 120 reduces the period to one time per about 100 ms, and thus the delay may be reduced to about 100 ms. As described above, the Bluetooth beacon module 120 may reduce the period of transmission of a Bluetooth connection signal so as to be more quickly connected to the user terminal 20.

The Bluetooth beacon module 120 may release a Bluetooth connection to the user terminal 20 when controlling the doorlock 100 is completed by the user application 200. Here, the user terminal 20 may also be disconnected from the doorlock 100.

The user application 200 may be installed in the user terminal 20, may request user authentication from the management server 300, and may receive the user codebook from the management server 300 upon completion of the user authentication. Furthermore, upon receiving the iBeacon signal from the doorlock 100, the user application 200 may enter a state of being capable of controlling the doorlock 100, and may automatically control the opening/closing operation of the doorlock 100 when the user application 200 is wirelessly connected to the doorlock 100 via the user terminal 20. To this end, the user application 200 may include a user reservation/payment unit 210, a user authentication unit 220, and a doorlock control unit 230.

In the case where the digital doorlock system 1000 is applied to accommodations, the user reservation/payment unit 210 may carry out a customer's request about reservation or payment, or in the case where the digital doorlock system 1000 is applied to private residences, the user reservation/payment unit 210 may not be provided.

The user authentication unit 220, which serves to request authentication of a user of the digital doorlock system 1000, may request subscriber authentication in the case where the digital doorlock system 1000 is applied to accommodations, or may request authentication from residence members (family) in the case where the digital doorlock system 1000 is applied to private residences.

When user authentication (or subscriber authentication) from the management server 300 is completed via the user authentication unit 220, the doorlock control unit 230 may receive and store the user codebook.

Upon receiving the iBeacon signal from the doorlock 100, the doorlock control unit 230 may enter a state of being capable of controlling the doorlock 100, and when the doorlock control unit 230 is wirelessly connected to the doorlock 100, the doorlock control unit 230 may operate in the background of the user terminal 20 to control the doorlock 100.

Upon receiving the password request signal from the doorlock 100, the doorlock control unit 230 may provide the password response information according to a request on the basis of the user codebook. Here, the password request signal and the password response information are described above in relation to the opening/closing control module 130 of the doorlock 100, and are thus not described further.

Meanwhile, the user terminal 20 according to the present embodiment, which is a mobile device having a Bluetooth function and an iBeacon function, may include any types of handheld-based wireless communication devices such as personal communication system (PCS), global system for mobile communications (GSM), personal digital cellular (PDC), personal handyphone system (PHS), personal digital assistant (PDA), international mobile telecommunication (IMT)-2000, code division multiple access (CDMA)-2000, W-CDMA, wireless broadband Internet (WiBro) terminals, smartphones, smartpads, tablet PCs, etc.

The management server 300 may provide a password for controlling the opening/closing operation of the doorlock 100 to the user application 200 through user authentication. To this end, the management server 300 may include a reservation payment processing module 310, a user authentication processing module 320, a data generation module 330, and a data communication module 340.

The reservation payment processing module 310 serves to process a reservation or payment request from the user application 200 in the case where the digital doorlock system 1000 is applied to accommodations, or the reservation payment processing module 310 may not be provided in the case where the digital doorlock system 1000 is applied to private residences.

The user authentication processing module 320 may process user authentication (or subscriber authentication) requested from the user application 200, on the basis of pre-stored user information.

The data generation module 330 may generate the user codebook to be provided to a user (or subscriber) when user authentication is completed through the user authentication module 320. The user codebook is described above in detail, and is thus not described here.

The data communication module 340 is connected to the user terminal 20 through wireless Internet access so as to enable communication with the user terminal 20.

Meanwhile, only the proximity sensor 140 may be applied in the case where the digital doorlock system according to the present embodiment is applied to accommodations, or the touch/pressure sensor (150) may be applied in the case where the digital doorlock system is applied to private residences.

Figure 3:
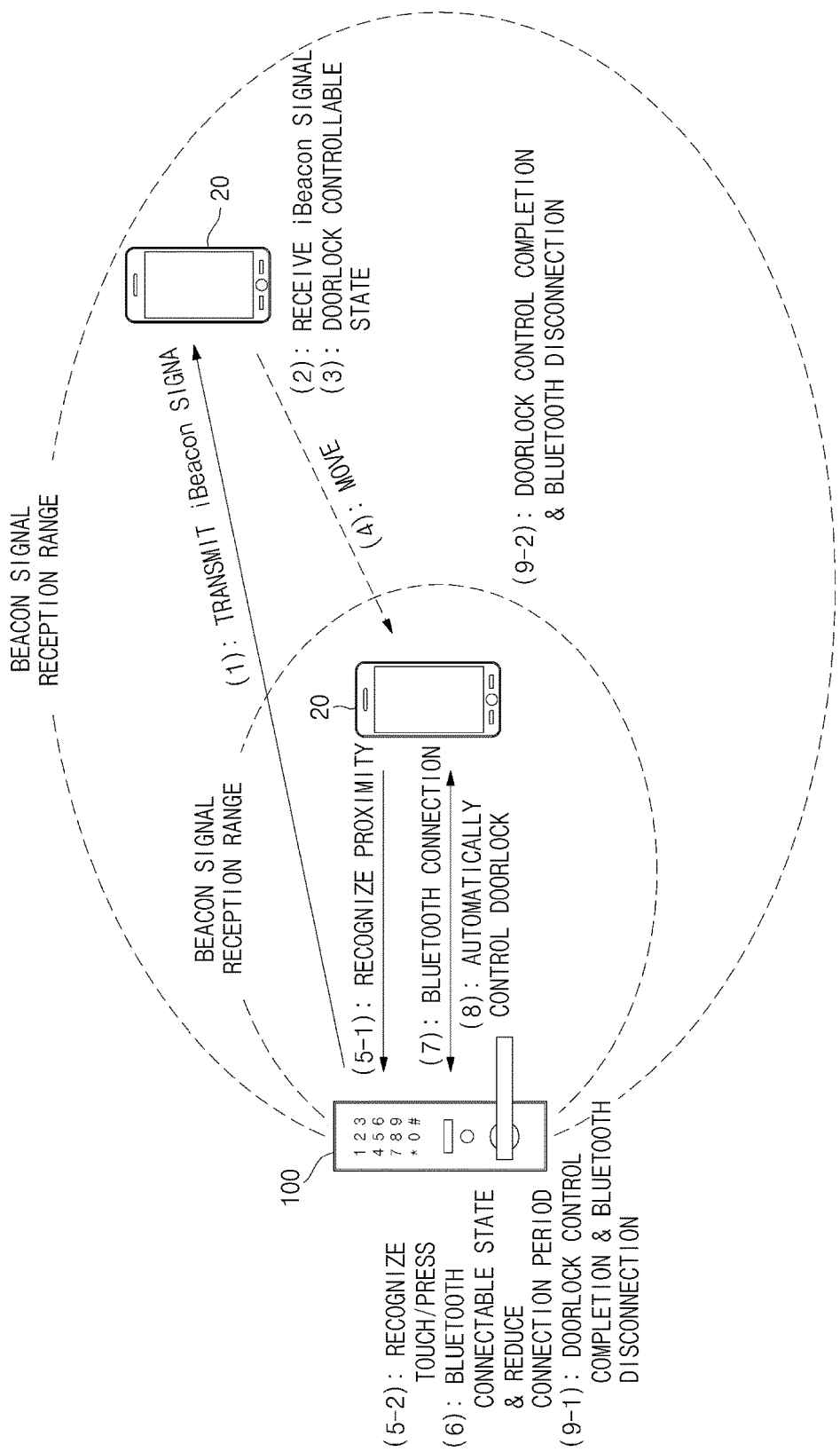
FIG. 3 is a diagram illustrating an operation method of the digital doorlock system according to an embodiment of the present invention.
Figure 4:
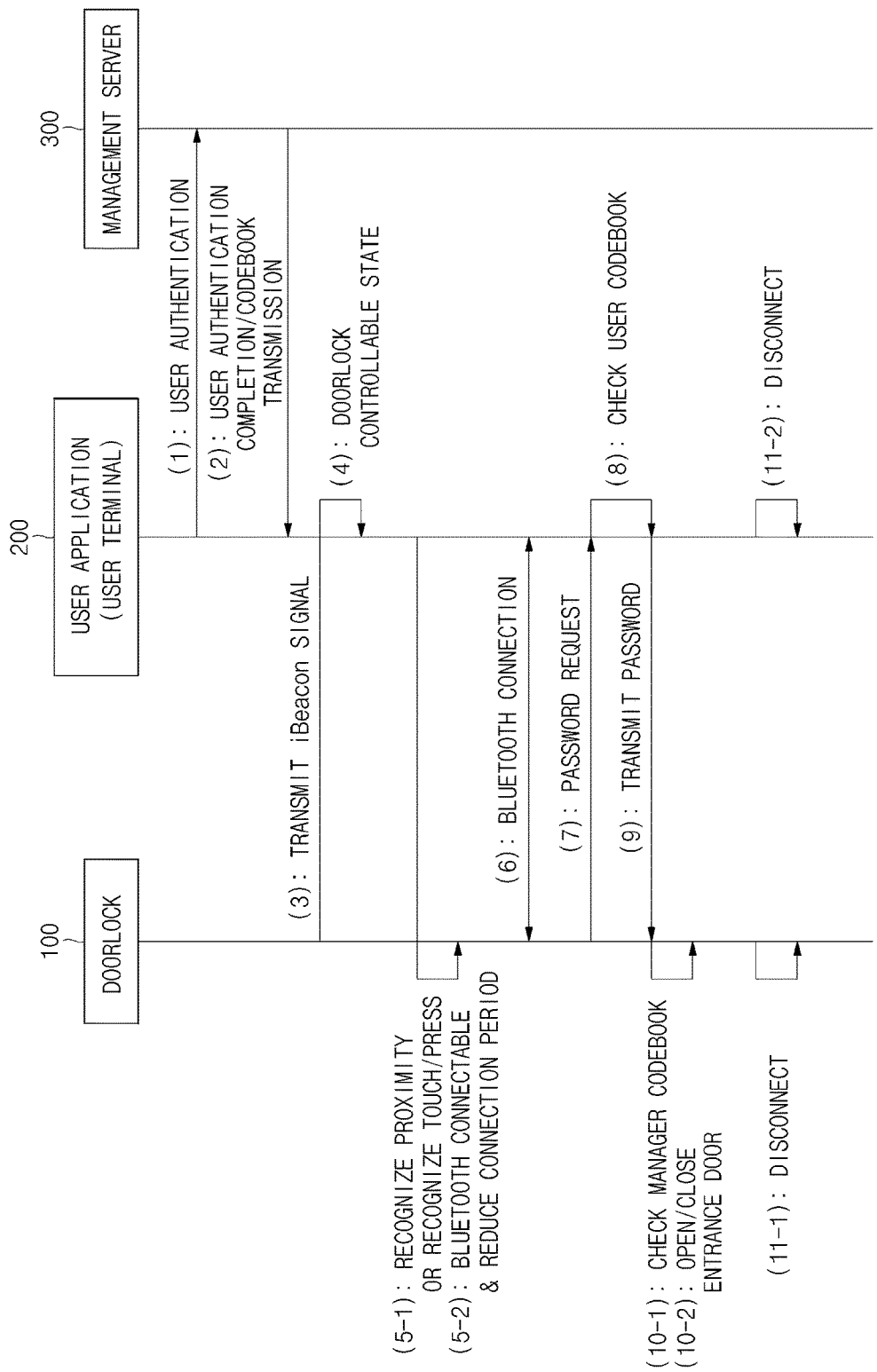
FIG. 4 is a diagram illustrating an operation sequence of the digital doorlock system according to an embodiment of the present invention.
Figure 5:
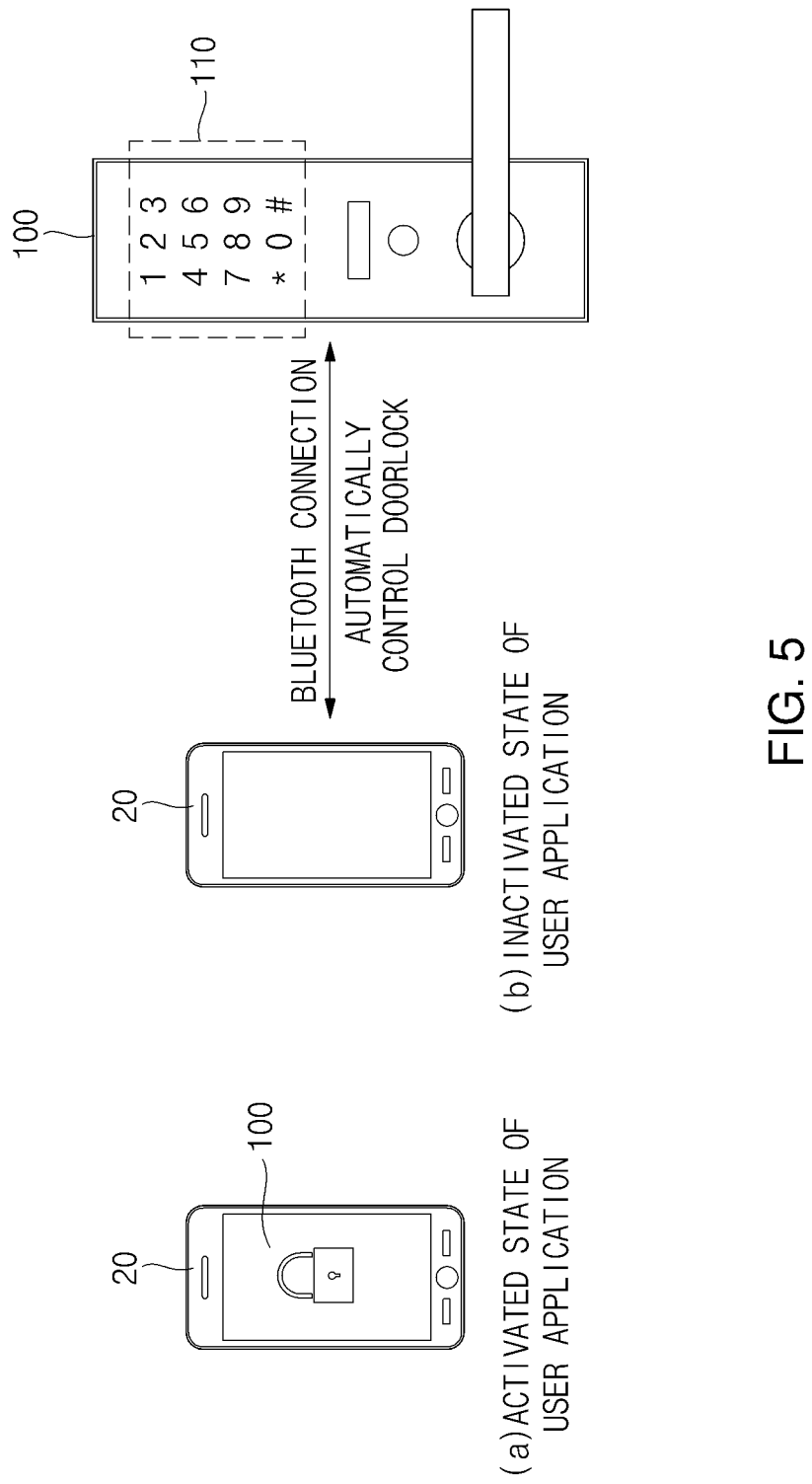
FIG. 5 is a diagram illustrating an operation situation of a user application according to an embodiment of the present invention.

FIG. 3 is a diagram illustrating an operation method of the digital doorlock system according to an embodiment of the present invention, FIG. 4 is a diagram illustrating an operation sequence of the digital doorlock system according to an embodiment of the present invention, and FIG. 5 is a diagram illustrating an operation situation of a user application according to an embodiment of the present invention.

The operation of the digital doorlock system 1000 of the present invention will be described in detail with reference to FIGS. 3 to 5.

As illustrated in FIG. 3, when the user comes within a range in which the iBeacon signal transmitted from the doorlock 100 is receivable while carrying the user terminal 20, the doorlock 100 transmits the iBeacon signal within a certain distance (1), and the user terminal 20 receives the iBeacon signal transmitted from the doorlock 100. Upon receiving the iBeacon signal transmitted from the doorlock 100, the user terminal 20 may enter a state of being capable of the doorlock 100 (3).

Thereafter, the user moves (4), and when the user terminal 20 is in proximity to the doorlock 100 within a certain distance and the doorlock 100 recognizes a user's touch and/or press on the keypad 110 (5-1, 5-2), the doorlock 100 is switched to a Bluetooth connectable state and reduces the period of transmission of the Bluetooth connection signal so that the period of Bluetooth connection is reduced (6).

As described above, since the doorlock 100 reduces the period of Bluetooth connection (7), a delay that may occur during Bluetooth connection may be minimized. Furthermore, by double checking the proximity of the user terminal 20 to the doorlock 100 by using both the proximity sensor 140 and the touch/pressure sensor 150, the doorlock 100 is prevented from being operated indoors.

Thereafter, regardless of whether the user application 200 is activated or not, the user terminal 20 may control the doorlock 100 via the user application 200 (8). In more detail, as illustrated in FIG. 5A, the doorlock 100 may be controlled by user's manipulation while the user application 200 is activated, and as illustrated in FIG. 5B, the user application 200 may operate so that the doorlock 100 may be controlled even in the background of the user terminal 20, i.e., in a lock screen state.

Thereafter, when controlling the doorlock 100 is completed, the doorlock 100 and the user terminal 20 release a Bluetooth connection, and in this manner, a stable performance for Bluetooth connection may be maintained even when the proximity of another terminal is recognized (9-1, 9-2).

FIG. 4 illustrates the operation sequence of the digital doorlock system 1000 using a chart, but this operation sequence is the same as described above with reference to FIGS. 3 and 5, and thus the operation sequence is not described in detail here.

According to the present embodiment, the digital doorlock system may be applied to doorlocks for accommodations or residences so that a sense of inconvenience or insecurity of users of Bluetooth-based doorlocks may be relived, and a single doorlock may be safely used through a plurality of user terminals by allowing sharing of codebooks.

Furthermore, since the digital doorlock system operates in response to the proximity of a user terminal to a doorlock without requiring activation of a user application, user convenience may be improved.

In particular, in the case where the digital doorlock system is applied to accommodations, since user authentication and a codebook are processed by and received from a management server, a waiting time at a counter may be reduced.

An embodiment of the present invention may provide a digital doorlock system capable of minimizing a delay that may occur during controlling a doorlock through short-range wireless communication, and improving ease of use and stability by enabling the doorlock to be controlled even when an application is not activated.

Although the digital doorlock system has been described with reference to the specific embodiments, it is not limited thereto. Therefore, it will be readily understood by those skilled in the art that various modifications and changes can be made thereto without departing from the spirit and scope of the present invention defined by the appended claims.

What is claimed is:

1. A digital doorlock system using Bluetooth beacon communication, the digital doorlock system comprising:
    a doorlock configured to transmit an iBeacon signal and reduce a period of Bluetooth connection when recognizing proximity of a user terminal and at least one of a touch or a press on a keypad, wherein the doorlock is wirelessly connected to the user terminal so that an opening/closing operation of the doorlock is controlled;
    a user application installed in the user terminal and configured to enter a state of being capable of controlling the doorlock upon receiving the iBeacon signal and control the opening/closing operation of the doorlock when wirelessly connected to the doorlock via the user terminal; and
    a management server configured to provide a password for controlling the opening/closing operation of the doorlock to the user application through user authentication.

2. The digital doorlock system of claim 1, wherein the doorlock comprises:
    the keypad configured to operate in response to the touch or the press;
    a Bluetooth beacon module configured to transmit the iBeacon signal and communicate with the user application by being wirelessly connected to the user terminal;
    an opening/closing control module configured to request, via the Bluetooth beacon module, a password from the user application and open or close an entrance door according to the password received from the user application;
    a proximity sensor configured to recognize a metal part of the user terminal positioned in front of the doorlock to detect proximity of the user terminal; and
    a touch/pressure sensor configured to detect the touch or the press on the keypad.

3. The digital doorlock system of claim 2, wherein the Bluetooth beacon module reduces a period of transmission of a Bluetooth connection signal when the proximity of the user terminal and at least one of the touch or the press on the keypad are recognized by the proximity sensor and the touch/pressure sensor, and releases a Bluetooth connection when control of the doorlock by the user application is completed.

4. The digital doorlock system of claim 1, wherein, upon receiving the iBeacon signal from the doorlock, the user application operates in a background of the user terminal so as to enable control of the doorlock.

5. The digital doorlock system of claim 1, wherein, when the user authentication is completed through the user application, the management server provides a user codebook comprising a plurality of passwords having different coordinate information.

6. The digital doorlock system of claim 5,
wherein the doorlock simultaneously requests, from the user terminal, a plurality of passwords assigned to arbitrary coordinates or a password obtained by combining, in a specific order, values from respective passwords corresponding to the arbitrary coordinates on the basis of a pre-stored manager codebook,
wherein the user application responds to the request from the doorlock on the basis of the user codebook,
wherein the doorlock checks, on the basis of the manager codebook, response information received from the user application, and operates according to whether the response information matches the manager codebook.

* * * * *